73-659 SR
12/13/83 XR 4,419,900

United States Patent [19]

Scott et al.

[11] 4,419,900

[45] Dec. 13, 1983

[54] MACHINE HEALTH MONITORING SYSTEM

[75] Inventors: David R. Scott, Lancaster, Calif.; Thomas S. Rhoades, Colorado Springs, Colo.

[73] Assignee: Machine Monitoring Research & Development Program, Ariz.

[21] Appl. No.: 320,873

[22] Filed: Nov. 13, 1981

Related U.S. Application Data

[60] Division of Ser. No. 265,031, May 18, 1981, which is a continuation of Ser. No. 86,772, Oct. 22, 1979, Pat. No. 4,287,511.

[51] Int. Cl.[3] .............................................. G01L 5/00

[52] U.S. Cl. .................................. 73/862.06; 73/659

[58] Field of Search ..................... 73/659, 763, 862.06, 73/104; 29/34 R, 407; 100/99

[56] References Cited

U.S. PATENT DOCUMENTS

| | | | |
|---|---|---|---|
| 2,866,301 | 12/1958 | Koulicovitch et al. | 73/659 X |
| 3,930,248 | 12/1975 | Keller | 100/99 X |
| 4,195,563 | 4/1980 | Budraitis et al. | 100/99 |
| 4,327,591 | 5/1982 | Dybel et al. | 73/862.06 X |
| 4,342,233 | 8/1982 | Edmondson et al. | 73/862.06 |

*Primary Examiner*—Jerry W. Myracle
*Attorney, Agent, or Firm*—William H. Drummond

[57] ABSTRACT

A system employing structural moment detectors for collecting and interpreting data reflecting the effect of at least a selected one of a plurality of forces acting on a structure such as a machine tool. The output signals from the moment detectors are processed to modify the information content (including rejecting components of the signals which reflect extraneous forces other than the selected one). The processed signals are then manipulated to provide secondary signals which are responsive to the condition of the structure as a result of the application of the selected force.

1 Claim, 5 Drawing Figures

MACHINE HEALTH MONITORING SYSTEM

This application is a division of co-pending application Ser. No. 265,031, filed May 18, 1981, entitled "System for Assessing the Integrity of Structural Systems", which is, in turn, a continuation of co-pending application Ser. No. 86,772, filed Oct. 22, 1979, entitled "Intrusion Alarm System Utilizing Structural Moment Detector As Intrusion Sensor and as Receiver for a Mechanical Intrusion and Command Signal", now issued as U.S. Pat. No. 4,287,511.

This invention relates to systems employing structural moment detectors for collecting and interpreting data reflecting the effect of at least a selected one of a plurality of forces acting on a structure.

In a further aspect the invention pertains to such systems for assessing the integrity of a structure.

In yet another respect the invention pertains to such systems for measuring loads applied to a structure or measure the ability of a structure to carry its design load.

In still another aspect the invention relates to such systems which are employed to improve basic physical measurement schemes.

In still another respect it pertains to such systems which are applied to effect detection and/or communication functions.

BACKGROUND OF THE INVENTION

Structural moment detectors, which are basically autocollimators which are insensitive to linear dynamic motion but which respond to angular deflection of one end of the sensor with respect to the other, are known in the art. For example, such sensors are disclosed in the patent to Rossire, U.S. Pat. No. 3,229,511 and in the publication entitled "The Structural Rigidity Sensor: Applications in Non-Destructive Testing", published by the Air Force Systems Command, U.S. Air Force (Frank J. Seiler, Research Laboratory, Publication SRL-TR-75-0017, October 1975). See also the U.S. Pat. Nos. to Okubo 4,159,442 issued June 26, 1979 and 4,164,149 issued Aug. 14, 1979.

Systems which employ structural moment detectors to measure and record certain effects of forces acting on a structure are also disclosed in the publications described above. For example, the Rossire patent discloses an aircraft attitude control system in which a structural moment detector is used to sense wing loading and automatically adjust the attitude of the aircraft to maintain wing loading within safe operational limits. The Air Force publication and the Okubo patents disclose systems which employ structural moment detectors to obtain the "vibration signatures" of various structures such as airframes, buildings, aerospace vehicles, rotating machinery bearings, dams, and the like.

SUMMARY OF THE INVENTION

The present invention relates to improvements in systems for collecting and interpreting data reflecting the effect of at least a selected one of a plurality of forces acting on a machine tool for forming and/or bending materials.

These systems and applications can, for convenience, be roughly categorized, as follows (it being understood that some of these systems and applications may overlap or fall into more than one category):

Basic Measurement Systems
Structural Integrity Measurement Systems
Applied Structural Measurement Systems
Applied Load Measurement Systems
Applied Communication-Detection Systems Although the details of each such system and/or end-use application will vary somewhat, in general they will comprise a system for collecting and interpreting data reflecting the effect of at least a selected one of a plurality of forces acting on a structure and will include at least one structural moment detector carried by the structure for generating output signals in response to the plurality of forces acting on the structure, means for processing the output signals to modify the information content thereof (including rejecting components of said signals which reflect extraneous forces other than the selected one) and means for manipulating the processed signals to provide secondary signals which are responsive to the condition of the structure as a result of the application of the selected force.

As used herein the term "forces acting on a structure" is intended to include not only primary external forces applied to the structure but also includes secondary external or internal effects which flow from the application of external forces or changes in the environment of the structure, such as, for example, strain energy released within the structure as a result of cracking, thermal stresses, gravity-induced effects, electromagnetic forces and stresses, and the like.

DESCRIPTION OF THE PREFERRED EMBODIMENTS

As used herein, the term "structural moment detector" means a device which measures the integral of the structure moment between two points on the structure. Such devices are known in the art, but, for clarity, a typical structural moment detector will be briefly described in FIGS. 1–3 and the accompanying descriptive material.

Figure 1:
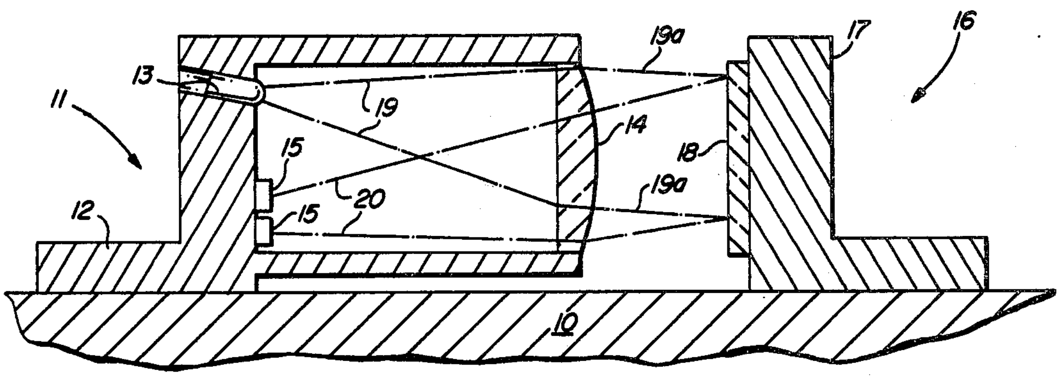
FIG. 1 is a sectional view of a typical structural moment detector which is used in the systems and end-use applications of the invention.
Figure 2:
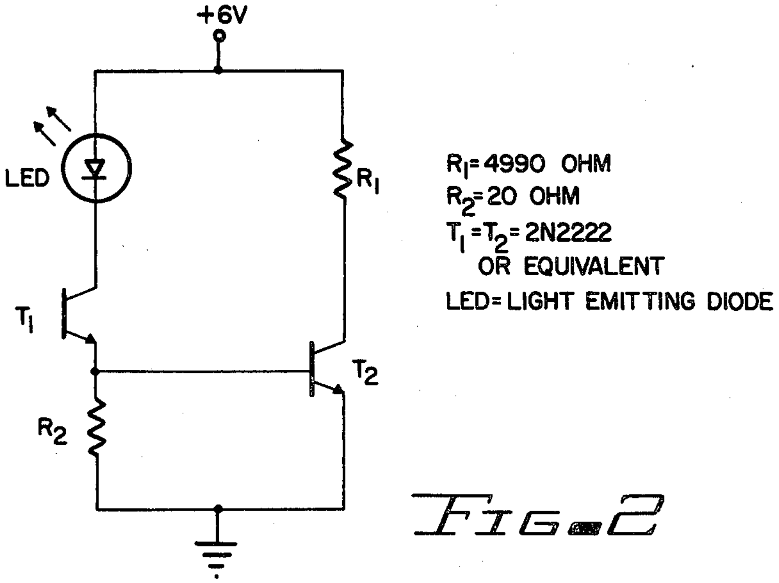
FIG. 2 is a typical schematic of the LED driver circuit of the structural moment detector of FIG. 1.
Figure 3:
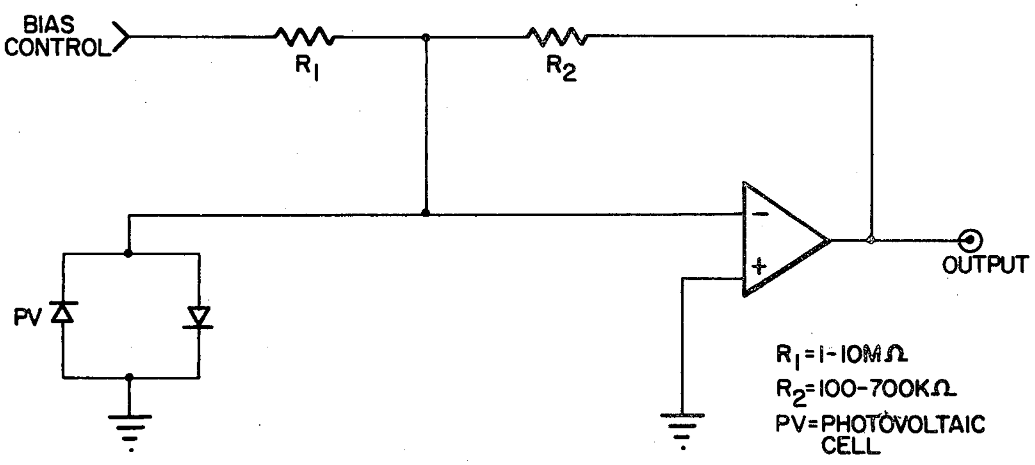
FIG. 3 is a typical schematic of the readout electronics circuits of the structural moment detector of FIG. 1.

Although FIGS. 1–3 and the accompanying descriptive material refer to one particular form of structural moment detector, it will be understood by those skilled in the art that the term "structural moment detector" is intended to include other forms of the device which function in the same basic manner.

The structural moment detector is basically an autocollimator that is insensitive to linear dynamic motions but responds to angular deflection of one end of the sensor with respect to the other. Referring to FIG. 1, the structural moment detector consists of two separate parts which are mounted at spaced locations on a beam 10. One of the parts 11 is a support bracket 12 which carries a light-emitting diode (LED) 13, a collimating lens 14 and dual photovoltaic detectors 15. The other part 16 of the structural moment detector consists of a support bracket 17 which carries a plane front mirror 18. The two parts 11 and 16 are suitably joined by a bellows or other hood member (omitted for clarity of illustration) to exclude extraneous light. The LED 13 emits an infrared light beam 19 which is collimated by the collimating lens 14. The collimated light beam 19a impinges on the mirror 18 and, as indicated by the dashed lines 20, is reflected back through the collimating lens 14 to the photovoltaic cells 15. Angular motions, but not linear motions, of the mirror 18 result in varying amounts of infrared radiation reaching each of the photovoltaic cells 15. The difference in voltage output of the photovoltaic cells 15 is then proportional to the angular motion of the mirror 18 with respect to the cells 15.

When mounted on structural building components such as floor, ceiling or wall beams, such structural moment detectors can measure the deflection of the beam with a resolution of 1 milliarc second ($4.85\times10^{-9}$ radians) with a range of $\pm6$ arc seconds. Where such accuracy is not required, such devices can be fabricated which have a resolution of at least 1 arc second with a dynamic range of $\pm3°$. Such devices are capable of operating from DC to 50 MHz, the upper limit being established by the frequency limitation of the photovoltaic cells.

Typical circuits which are used in conjunction with the mechanical components of the structural moment detector of FIG. 1 are illustrated in FIGS. 2 and 3. FIG. 2 is a schematic diagram of a suitable LED driver circuit which is a simple constant current source circuit which is required to provide a light source with constant light intensity. A typical suitable readout circuit is illustrated in FIG. 3, which depicts an analog output circuit consisting of a first stage amplifier with common mode rejection that permits linear operation of the photovoltaic cells.

The operation of the structural moment detector can be illustrated by reference to a simplified example of a cantilevered beam which is loaded and the structural moment detector is mounted at points a and b located near the supported end of the cantilevered beam. If the deflection of the beam is measured as $\theta$, the angle between surface tangents at points a and b, the output voltage of the photovoltaic cells is proportional to this angle and, according to the Area Moment Theorem $$V_{out} \propto = \frac{\int_a^b Mdx}{EI} = \frac{1}{EI} \int_a^b Mdx$$

where

M is the applied moment between points a and b

E is the modulus of elasticity

I is the moment of inertia $\theta$ is the angular difference between surface tangents at points a and b x is the linear surface distance between points a and b.

If a load P is placed on the end of a beam of length L and $\delta$ is the distance between points a and b, then $$V_{out} \propto \theta = \frac{1}{EI}\ \frac{PL\delta}{2}$$

To illustrate the sensitivity of the structural moment detector, a load of 1 gram was placed on the end of an 8″ cantilevered beam. The device was mounted near the support of the beam such that points a and b were 1.5″ apart. With this load $$V_{out} = 30 \text{ millivolts}$$

and $$\theta = 1.3\times10^{-7} \text{ radians.}$$

Figure 4:
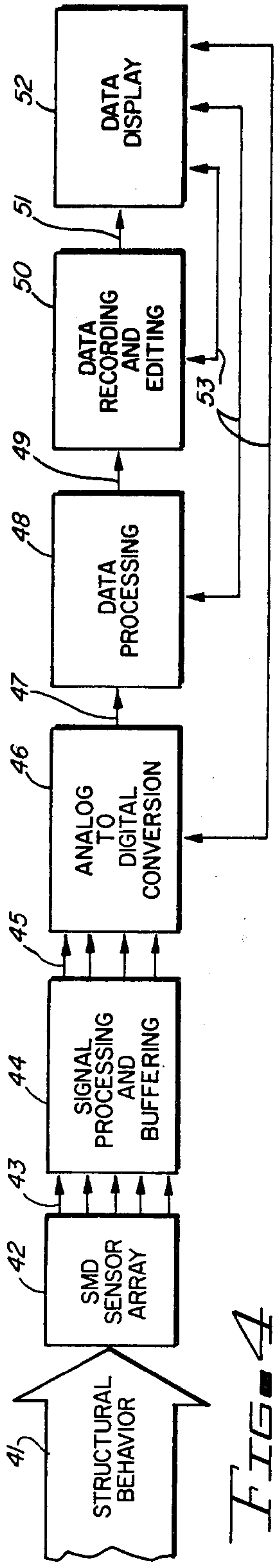
FIG. 4 is a schematic illustration of the general system of the invention.

Since it is impossible to load a structure without changing the total moment which occurs between two points on the structure, it is possible to use the structural moment detector as an extremely accurate and extremely sensitive sensor having a range which far exceeds that of conventional sensors of the prior art As previously indicated, the various systems of the inventio fall into several basic categories. In general, however, with exceptions noted below, the various systems will generally include similar elements in addition to the structural moment detectors. The general system of the invention is schematically illustrated in FIG. 4. As shown in FIG. 4, the structural behavior 41, which is effected by the forces acting on the structure, are sensed by an array 42 of structural moment detectors (SMD's), located on the structure. The SMD's 42 are located on the structure so as to provide primary electronic signals 43 which are proportional to the structural behavior parameter of interest. The primary electronic signals 43 from the SMD array 42 are fed to signal processing and buffering equipment 44, which includes electronic circuitry which modifies the information content of the primary signals 43 (e.g., rejection of background noise, rejection of signal components induced by other forces, etc.) and which electrically isolate the sensors from the remainder of the system. The processed signals 45 are then transmitted to analog-to-digital converters 46 which convert the analog information in the processed signals 45 to a digital format compatible with various digital processors, recorders, editors and/or display units. The digital signals 47 are then transmitted to a data processor 48 which will usually be a single-frame computer which is capable of accepting digital data and manipulating it in a predetermined, programmable fashion, in order to convert the digitized measurement information into a digital representation of the desired system data. The digital representation data 49 is optionally transmitted to data recording/editing equipment 50 which may provide for permanent recording of all or part of the acquired data for later use and which may, additionally, provide manual editing capability. The recorded and/or edited data 51 may optionally be transmitted to data display equipment 52 which provides visual display of the acquired data and, additionally, may provide for the predetermined alteration of the means by which the data processing equipment 48 is transforming acquired data or the manner in which data is digitized, recorded, edited and/or displayed. Feedback loops 53 may be optionally provided, through which the information at one stage is fed backwardly and/or forwardly to another stage of the system to provide improved accuracy, estimation, prediction or other similar functions. These feedback paths may be electrical, optical, mechanical and/or may involve human interpretations and adjustments.

Various improved systems and applications which embody the present invention will be discussed below in the groups of categories previously indicated.

BASIC MEASUREMENT SYSTEMS

According to the invention, SMD's are employed in systems which perform measurement of basic parameters such as weight, displacement, acceleration, pressure, angle and torque/power.

Weight Measuring System

In this embodiment, the SMD is mounted on a suitable structure such as a cantilevered beam with known flexural rigidity. The output of the SMD is $$O_{SMD} = \frac{1}{EI} \int f(\text{loading})dx$$

where 1/EI is the effective flexural rigidity of the structure and f (loading) indicates the local bending moment due to the structural loading. If EI is known, then the sensor output is directly related to the weight (load) applied.

The SMD measurement system is much more sensitive than current systems which employ balances, pressure transducers, strain gages or springs. Hence, this system provides for precise measurements of weight without moving parts and without sophisticated electronics.

According to this embodiment of the invention, systems are provided for monitoring the health of machine tools for forming and/or bending materials.

This invention as it applies to complex operating machines is based on the real time assessment of the "vibration signature" of the machine. Subsequently, this knowledge and information is applied to the design optimization of future machines as well as the prediction of the remaining lifetime of existing machines.

The concept of monitoring the vibration signature of a mechanical system for an indication of the mechanical health of the system is well established. Every operating mechanical system has a distinct vibration signature which is produced when the system is operating properly. When a malfunction occurs the signature changes. Appropriate observation and analysis of the vibration signature can therefore provide an early indication of the severity and location of possible trouble and can help to prevent costly catastrophic failure.

The actual vibration signature of a machine contains many frequencies. This is a result of different components vibrating at various discrete frequencies and various mechanical resonances and nonlinear combinations of those signals in the machine. The resultant signal at a measurement point is therefore a complex vibration wave form which is processed to reduce it to its discrete frequency components for analysis.

The monitoring system of this embodiment consists of sensors (vibration transducers), a signal processor (monitoring system) and suitable displays or alarm generating devices. Sensors commonly in use are the piezoelectric accelerometer and the inductive velocity transducer. While there is limited agreement on the specific crossover frequency, there is general agreement that vibration severity is proportional to velocity at relatively low frequencies and proportional to acceleration at high frequencies. Thus, the applications of the piezoelectric and velocity transducers are naturally separated by frequency. In addition, velocity transducers are generally rugged, operate over wide temperature ranges, produce relatively high signal to noise outputs, but are limited to about 1000 Hz. Piezoelectric accelerometers are more sensitive to contamination. Both have frequency ranges which are significantly influenced by the method of attachment to the machine.

Both the velocity transducer and the piezoelectric accelerometer respond to displacements perpendicular to their mounting surface. The SMD, however, measures the difference between planes perpendicular to the surface to which it is mounted, that is, the measurement motion is 90° to that of other sensors.

The significant point is not that suitable mountings will permit direct replacement of velocity transducers, strain gage and piezoelectric accelerometers. Rather, the significant point is that the SMD responds to transverse and longitudinal waves in a body which cause the surface to deflect as little as $3.5\times10^{-9}$ radians across the 1.5 inch length of the sensor (a surface displacement of $5.3\times10^{-3}$ microinches).

In the measurement of these ultra small deflections, the SMD has a frequency response which is essentially flat from 0 to 40 KHz. Combinations of velocity and acceleration sensors in the best VMS systems currently in use provide a flat response from 0 to 20 KHz only.

In addition to this extreme sensitivity and wide frequency response, the SMD is rugged and well-suited to field and plant use. It requires a minimum of electronics (standard buffer amplifiers and power supplies) to obtain a signal and it can be fabricated for less than $100. The SMD can also be fabricated to provide less sensitivity for less cost. The cost and sensitivity are design parameters and trade-off analyses are made for each application.

Thus, according to this embodiment of the invention, SMDs are not merely used to replace conventional sensors. Rather, a system is provided which, using the unique measurement provided by the SMD, analytically and experimentally correlates and makes understandable the measurement of and meaning of vibration and mechanical health of complex equipment.

Specifically, the invention:

1. Provides a warning if the structure approaches or exceeds operating limitations.
2. Permits better use of lightweight, efficient structural design. If pending failure can be predicted more accurately, design safety factors can be reduced. This translates to lower cost and higher performance.
3. Extends the life of existing systems. If the remaining fatigue life of a system can be more accurately defined, replacement can be delayed.
4. Provides "expert witness testimony." The recorded information positively establishes conditions prior to an incident or failure.

Figure 5:
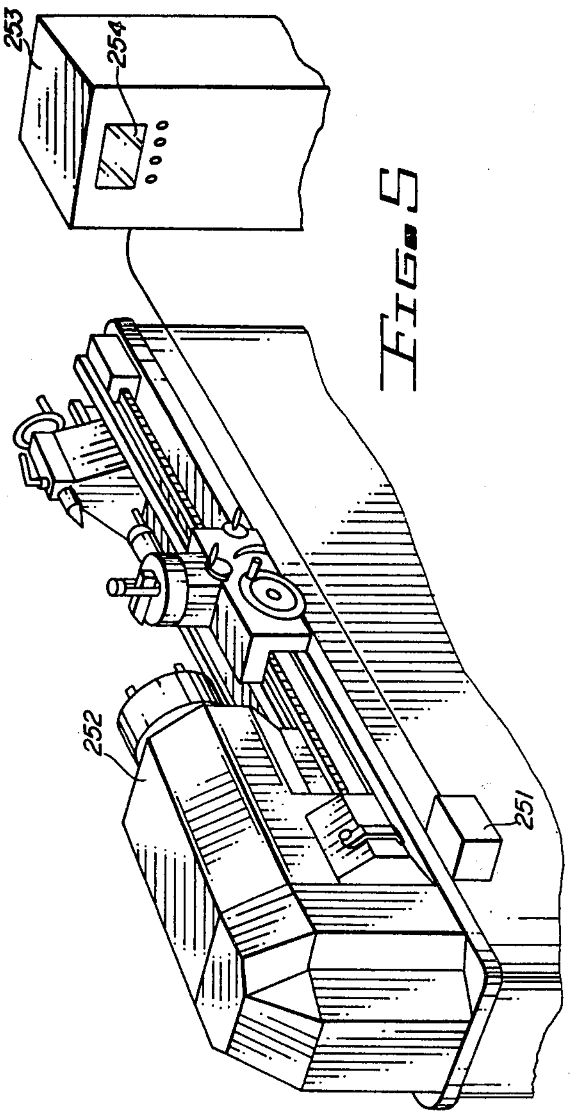
FIG. 5 depicts an embodiment of the invention used for monitoring the mechanical health of complex rotating or reciprocating machinery.

Referring to FIG. 40 which illustrates a typical application of the system of this embodiment of the invention, SMD sensors 251 are mounted at one or more locations on the frame of a complex machine such as the lathe 252 illustrated in FIG. 5. The output of the sensors 251 is fed to an electronics/data processing package 253 which is provided with appropriate data recorders 254 and displays.

Having described our invention in such clear and concise terms to enable those skilled in the art to understand and practice it, we claim:

1. A system for collecting and interpreting data reflecting the effect of at least a selected one of a plurality of forces acting on a machine tool for forming and/or bending metals, said system comprising, in combination:

(a) at least one structural moment detector carried by said machine tool assembly for generating output signals in response to said plurality of forces acting on said machine tool assembly;

(b) means for processing said output signals to modify the information content thereof, including rejecting components of said signals which reflect the effects of extraneous forces other than said selected one; and (c) means for manipulating said processed signals to provide secondary signals responsive to the condition of said machine tool assembly as a result of the application of said selected force.

* * * * *